United States Patent [19]

Abbott et al.

[11] 4,298,977

[45] Nov. 3, 1981

[54] BROADCAST AND ALTERNATE MESSAGE TIME SLOT INTERCHANGER

[75] Inventors: Robert P. Abbott, Freehold Township, Monmouth County; Ming-Chwan Chow, Holmdel; Anthony J. Cirillo, Cranford; Rudolph C. Drechsler, Freehold Township, Monmouth County; Lee F. Horney, II, Fair Haven, all of N.J.

[73] Assignee: Bell Telephone Laboratories, Incorporated, Murray Hill, N.J.

[21] Appl. No.: 73,849

[22] Filed: Sep. 10, 1979

[51] Int. Cl.³ ..................... H04Q 11/04; H04M 3/56
[52] U.S. Cl. ........................................ 370/62; 370/67; 370/68; 179/18 B; 179/18 BF; 179/18 BC
[58] Field of Search ..................... 370/68, 67, 66, 62; 179/18 B, 18 BF, 18 BC

[56] References Cited

U.S. PATENT DOCUMENTS

| 3,263,030 | 7/1966 | Stiefel | 370/66 |
| 3,740,483 | 6/1973 | Pederson | 370/68 |
| 3,937,898 | 2/1976 | Presto | 370/62 |
| 3,956,593 | 5/1976 | Collins | 370/66 |

Primary Examiner—David L. Stewart
Attorney, Agent, or Firm—Richard J. Roddy

[57] ABSTRACT

It is common that communications such as telephone calls between calling and called lines be made by sharing a single communications path on a time division basis. Each call is assigned to a shared path for a short time interval, also called a time slot. It is known to interchange an input time slot to a different output time slot. Unfortunately, known time slot interchange arrangements insert an input sample in a single output time slot. The instant time slot interchanger extends an input sample onto a plurality of output time slots for broadcasting a sample through a plurality of locations. Also, the instant time slot interchanger may selectively insert an alternate message, e.g., an error message, in an output time slot.

5 Claims, 3 Drawing Figures

BROADCAST AND ALTERNATE MESSAGE TIME SLOT INTERCHANGER

TECHNICAL FIELD

This invention relates to time division multiplexing (TDM) and, more particularly, to a TDM arrangement for interchanging samples among time slots.

BACKGROUND OF THE INVENTION

It is common that connections such as telephone calls between calling and called lines be made by sharing a single communications path on a time division basis. Each call is assigned to a shared path for a short time interval and the connection between the two lines is completed only during the short time interval, also called a time slot in the TDM art. Otherwise, the time slot is available to be shared by other connections.

U.S. Pat. No. 3,263,030; entitled, "Digital Cross Point Switch" and issued July 26, 1966; discloses an arrangement for switching message bits from a first input time slot to a second output time slot. The arrangement includes two shift register message stores, which are utilized for writing digital data into one store while digital data are read out of the other store, and vice versa. The stored message bits are read through message gates in such a manner that the time sequence of the outgoing message bits represents the desired switched order. That is, the time sequence of the incoming multiplexed message bits is interchanged into a different output order. The order of the outgoing message bits corresponds to the outgoing lines to which the respective bits are to be routed. The routing is accomplished by actuating, successively and in time sequence, line gates respectively associated with the outgoing lines.

Unfortunately, known time slot interchange arrangements insert an input sample in a single output time slot.

SUMMARY OF THE INVENTION

According to our invention, the above and other problems are solved with an improved time slot interchanger for broadcasting samples of information to many locations or for selectively replacing a sample with an alternate message. In an illustrative embodiment and according to one aspect of our invention, an input frame having a plurality of time slots is extended from an input terminal through a data store for storing the input frame and for interchanging a sample onto a plurality of output time slots for broadcasting the sample to a plurality of locations. According to another aspect of our invention, rather than inserting the input sample in the plurality of output time slots, our improved time slot interchanger includes an arrangement for selectively inserting an alternate message in the plurality of output time slots.

BRIEF DESCRIPTION OF THE DRAWING

The invention should become more apparent from the following detailed description when taken in conjunction with the accompanying drawing in which FIGS. 1 and 2, as arranged according to FIG. 3, illustrate one embodiment of a time slot interchanger in accordance with the principles of our invention.

DETAILED DESCRIPTION

Figure 1:
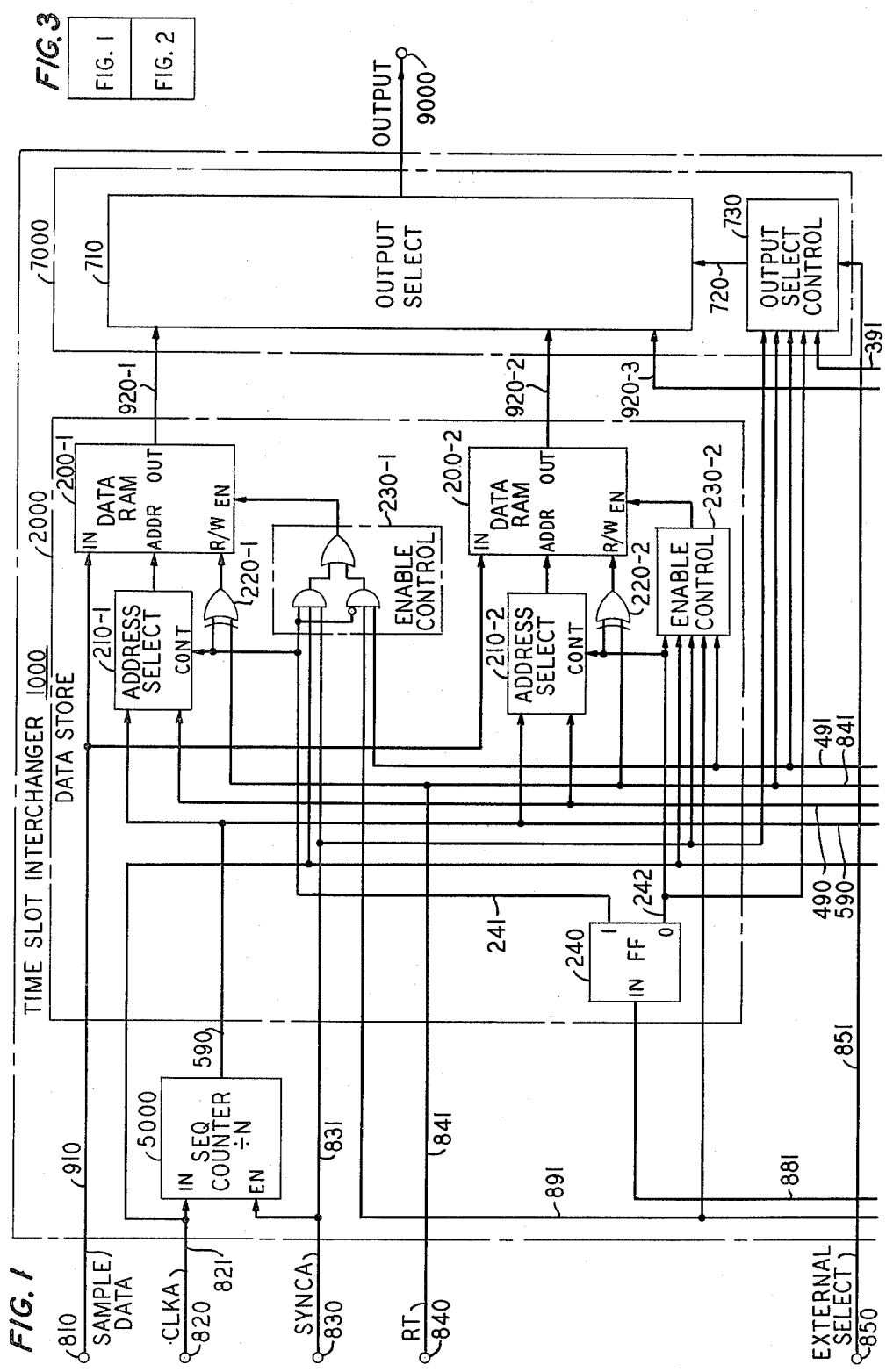
Figure 2:
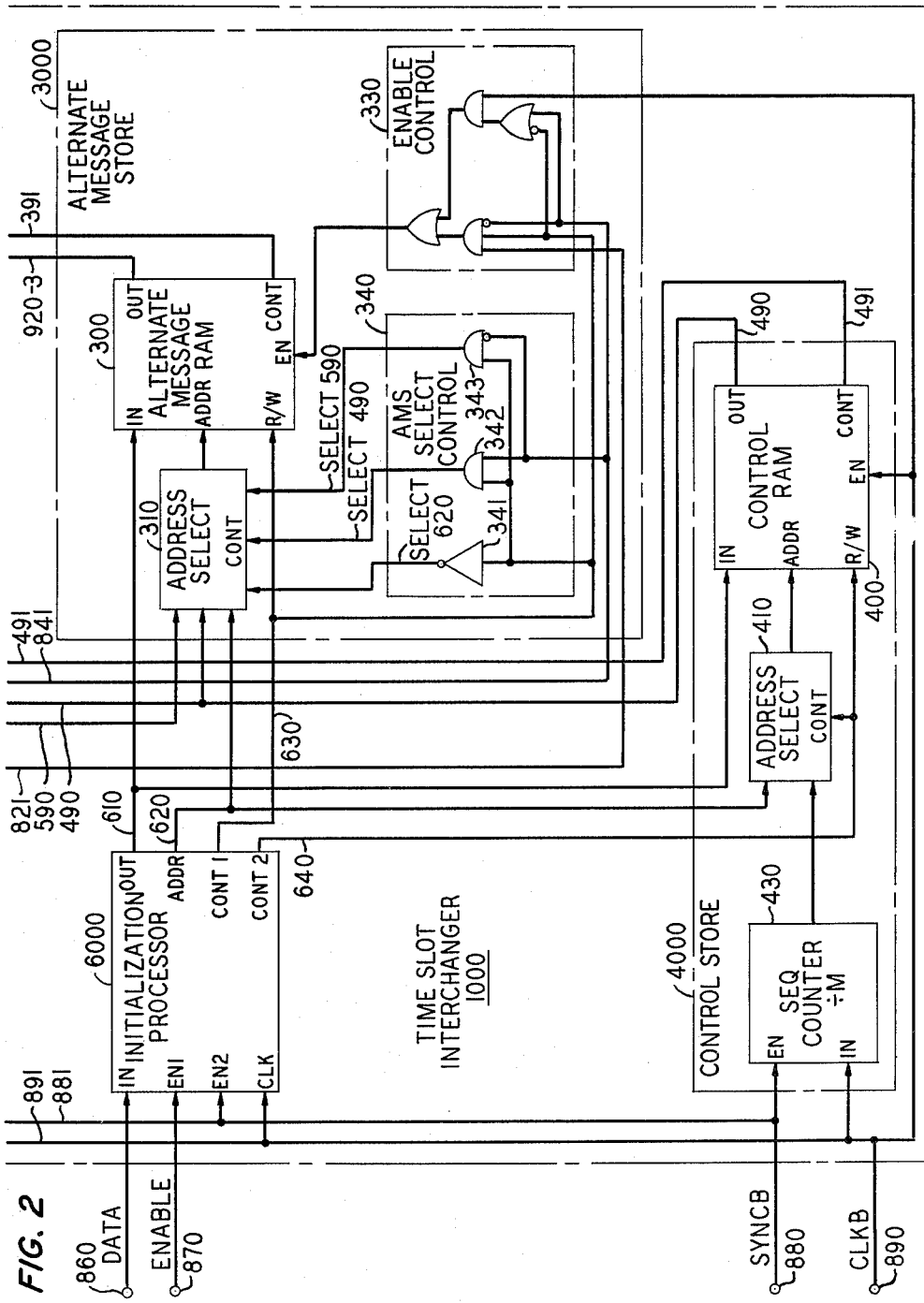

Broadly, referring to FIGS. 1 and 2 as arranged according to FIG. 3, a digital input frame, having N time slots and supplied to input terminal 810, is processed by time slot interchanger (TSI) 1000 for interchanging time slots. Thereafter, an output frame having M interchanged time slots is extended to output terminal 9000. A common digital frame is the 125 microsecond Bell System T1 carrier frame which includes digital samples of information inserted into 24 time slots. In our illustrative embodiment, we assume (N=) 24 input time slots and (M=) 256 output time slots. And, as will shortly be made more clear, this assumption obtains in our illustrative embodiment responsive to a logic 1 RT control signal detected at input terminal 840. On the other hand, and as will also become more clear, responsive to a logic 0 RT control signal, the inverse obtains, i.e., (N=) 256 input time slots can be supplied to input terminal 810 for being interchanged and inserted into (M=) 24 output time slots. Further, a plurality of TSIs 1000 may be arranged in parallel.

According to one aspect of our invention, an input time slot sample may be interchanged and inserted in one or more output time slots for broadcasting the sample of information to a plurality of locations. More particularly, a digital sample from an input time slot is extended in parallel from terminal 810 over cable 910 to data store 2000 and written for storage therein in a memory location of either data random access memory (RAM) 200-1 or data RAM 200-2. The address of the memory location into which the sample is written is supplied to data store 2000 over either cable 490 from control store 4000 or over cable 590 from sequential counter 5000. In our illustrative embodiment, control store 4000 supplies a "random" address while sequential counter 5000 supplies a sequential address. The source of address supply is selected responsive to the aforementioned RT control signal detected at input terminal 840. For example, on the one hand, responsive to a logic 0 RT control signal, the address of the RAM memory location to be written is supplied from control store 4000. On the other hand, responsive to a logic 1 RT control signal, the address of the RAM memory location to be written is supplied from sequential counter 5000. As aforementioned, for ease of description, we assume the RT control signal is a logic 1 and hence, samples are written sequentially in the data RAM. Recall, as also aforementioned, with the RT control signal being a logic 1, (N=) 24 input time slots are interchanged into (M=) 256 output time slots.

While a memory location within data RAM 200-1 is being written with a sample from an input time slot, a memory location within data RAM 200-2 is being read for inserting a sample in an output time slot. That is, each data RAM alternates between being written during one frame interval and being read during the next succeeding frame. In that connection, the memory location address for reading a RAM is also supplied to data store 2000 from either control store 4000 or sequential counter 5000. In our illustrative embodiment, the samples are written in sequential locations and the samples are read from "random" locations. That is, responsive to a logic 1 RT control signal, TSI 1000 reads a sample from the RAM memory location identified by the "random" address supplied by control store 4000. (It will be remembered that, responsive to a logic 0 RT control signal, an opposite operation obtains.) As the sample is read from either data RAM 200-1 or data RAM 200-2, the sample is extended over cable 920-1 or cable 920-2, respectively, through output selector 710 to output terminal 9000 for insertion into an output time slot.

We turn now to a more detailed description of the operation of data store 2000. Firstly, as to supplying the memory location address for writing or reading a data RAM, a binary control signal label SYNCB is provided to input terminal 880 and within TSI 1000 is extended over lead 881. The SYNCB signal may be a single pulse occurring at the end of each input data frame. Here, we assume that the SYNCB pulse occurs once for each 125 microsecond frame interval. The SYNCB signal is extended over lead 881 to an input of data store 2000 and therein to an input of flip-flop 240. The "1" output of flip-flop 240 is extended over lead 241 jointly to a control input of address select 210-1, a first input of exclusive OR gate 220-1, and an input of enable control 230-1. In dual fashion, the "0" output of flip-flop 240 is extended over lead 242 jointly to a control input of address select 210-2, a first input of exclusive OR gate 220-2, and an input of enable control 230-2. Also, the RT control signal, supplied to input terminal 840, is extended jointly over lead 841 to second inputs of exclusive OR gates 220-1 and 220-2. Responsive to a logic 1 on lead 241, or on its dual lead 242, address select 210-1, or its dual 210-2, respectively, operates in the sequential mode, i.e., the address supplied over cable 590 from an output of sequential counter 5000 is extended through the address select on an ADDR address input of the respective data RAM. On the other hand, responsive to a logic 0 on lead 241, or on its dual 242, the "random" address supplied over cable 490 from an output of control store 4000 is extended through the respective address select to the ADDR address input of the respective data RAM. Thereby, the memory location address is supplied writing or reading a data RAM.

Secondly, as to a first enabling of a data RAM to be written or read, an output of exclusive OR gate 220-1, or its dual exclusive OR gate 220-2, is extended to an R/W (read/write) input of the respective data RAM. In particular, the data RAM is written responsive to a logic 0 at its R/W input and read responsive to a logic 1 at its R/W input. In our illustrative embodiment, we assume that the RT control signal, which, as mentioned, is extended to second inputs of exclusive OR gates 220-1 and 220-2, is a logic 1. Hence, inasmuch as the binary control signal on each of leads 241 and 242 alternates between a logic 1 and a logic 0 on a frame by frame basis, here the alternating occurring each 125 microseconds, the memory location address supply alternates between counter 5000 and store 4000, respectively, and the output of the exclusive OR gates, and hence the R/W inputs, alternates in phase to sequentially write and randomly read the data RAMs. As mentioned, the randomly read samples from data RAM 200-1 or data RAM 200-2 are supplied over cable 920-1 or 920-2, respectively, through output selector 710 to output terminal 9000 for insertion in an output time slot.

Thirdly, a second enabling of a data RAM occurs to avoid spurious operation. Specifically, enable control 230-1, or its dual enable control 230-2, respectively, extends a logic 1 enable signal to a data RAM EN enable input. Responsive to a logic 1 EN signal, the data RAM will either read or write responsive to the signal supplied to its R/W enable input. On the other hand, responsive to a logic 0 data RAM EN input, the data RAM remains inactive. To provide the EN enable signal, each enable control includes AND gates and an OR gate, as shown for enable control 230-1, which, responsive to a logic 1 supplied from flip-flop 240, on either lead 241 or lead 242, the logic 1 meaning sequential addressing, allows the SYNCA signal at terminal 830 to be extended over lead 831 through the enable control to the respective data RAM EN enable input during each CLKA pulse. On the other hand, the enable control AND gates, responsive to a logic 0 supplied from flip-flop 240 on either lead 241 or lead 242, the logic 0 meaning random addressing, allow the enable signal provided by control store 4000 to be extended over lead 491 through the enable control to the respective data RAM EN enable input during each CLKB pulse. Thereby, each data RAM is enabled to be read or written and yet avoid spurious operation.

Fourthly, as to generating a sequential memory location address, sequential counter 5000 is enabled for providing a cyclical, sequential address over cable 590 responsive to a logic 1 SYNCA signal detected at input terminal 830. Thereafter, responsive to each of a CLKA clock signal at terminal 820 as extended over lead 821 sequential counter 5000 increments its existing count by unity and extends the resultant count over cable 590 as the sequential address. Here, while the SYNCHA signal is a logic 1 during a frame, the CLKA clock signal provides (N=) 24 equally spaced pulses and thereafter repeats by recycling itself. Responsive to the address on cable 590, a sample at terminal 810 is written in sequential memory locations of the selected data RAM. (Recall that when the RT control signal at terminal 840 is logic 0, the respective data RAM is sequentially *read* according to the address on cable 590.)

Fifthly, as to generating a "random" memory location address, referring to control store 4000 and initialization processor 6000, two states are considered. The first state is for initializing control store 4000 and the second state is for using control store 4000 for time slot interchange.

As to the first state, processor 6000 is employed for initializing control store 4000 and, as will be clarified shortly, for initializing alternate message store 3000. Processor 6000 may be a state of the art microprocessor for reading and formatting predetermined initializing data extended thereto from input terminal 860 when enabled responsive to an enable signal supplied to its input terminal 870. The initializing data may include an address of a memory location within control RAM 400 and predetermined data to be written therein. In our illustrative embodiment, control RAM 400 includes (M=) 256 memory locations, each location corresponding to an output time slot and each location for storing an input time slot number identification. According to the principles of our invention a specific input time slot number identification may appear in more than one memory location. Thereby, and according to this aspect of our invention, a broadcast arrangement is obtainable whereby a sample of information in one input time slot may be broadcast through a plurality of output time slots to many locations.

In particular, the initializing data are read by processor 6000 and processed thereby, e.g., by reformatting the data, (1) for providing the predetermined data, here the input time slot number identification, and the enable control signal for later extension on lead 491, over cable 610; (2) for providing a control RAM address, here corresponding to the output time slot number identification, over cable 620 through address select 410 to the ADDR address input of control RAM 400; and (3) for providing a logic 0 CONT2 control signal over cable 640 jointly (a) to the control input of address select 410 for selecting the address on cable 620 and (b) to a control RAM R/W input for enabling control RAM 400 to write the predetermined data in the location identified by the control RAM address. Also, the CLKB signal detected at input terminal 890 is extended over lead 891 jointly to the EN enable input of control RAM 400 for avoiding spurious operation of control store 4000 and to an input of hereinafter described enable control 330 for avoiding spurious operation of alternate message store 3000.

As to the second state, the state involving the use of control store 4000 for time slot interchange, processor 6000 extends a logic 1 CONT2 control signal over cable 640 for selecting the address provided by sequential counter 430 and for enabling control RAM 400 through its R/W input to read the predetermined data from the location identified by the selected address. Responsive to a SYNCB enable signal at terminal 880 as extended over lead 881 and to a CLKB clock signal at terminal 890 as extended over lead 891, counter 430 extends a cyclical, sequential address, here sequentially addresses 1 through (M=) 256, through address select 410 to the ADDR address input of control RAM 400. Here, the SYNCB signal may be substantially the same signal as the SYNCA signal while the CLKB clock signal provides (M=) 256 equally spaced pulses during one 125 microsecond frame interval. Responsive thereto, the addressed memory location is read and its contents are extended over cable 490 as the random address. Also, a logic 1 control signal is extended over lead 491 for controlling enable control 230-1 or 230-2 as hereinbefore described. In light of the above, it should be clear that the (M=) 256 memory locations of control RAM 400 are phase sensitive to the (M=) 256 output time slots. Inasmuch as the control RAM memory location contents identify both the input time slot and the data RAM memory location to be read and inasmuch as the control RAM memory location identifies the output time slot, TSI 1000 readily interchanges samples from an input time slot to one or more output time slots for broadcasting the sample to many locations.

According to another aspect of our invention, rather than inserting an input time slot sample into an output time slot, our TSI 1000 includes an arrangement for selectively inserting an alternate message in the output time slot. In our illustrative embodiment, alternate message store 3000 is for providing the alternate message, e.g., an error message. Broadly, rather than reading a sample from data store 2000 and inserting the sample into one or more output time slots, an alternate message may be read from alternate message store 3000 and extended over cable 920-3 through output select 710 for insertion in one or more output time slots. Alternate message store 3000 is initialized in a manner paralleling the initialization of control store 4000. On the one hand, responsive to a logic 1 CONT1 control signal on lead 630 as extended to its R/W input, alternate message RAM 300 is enabled to be read. As to the memory location address for reading, AMS select control 340 selects either the sequential address on cable 590 or the random address on cable 490 in a manner paralleling the aforedescribed data store operation. In our illustrative embodiment, inasmuch as the RT control signal at terminal 840 is assumed to be a logic 1 and the CONT1 control signal is assumed to be a logic 1, AMS select control 340 extends the random address on cable 490 through address select 310 to the ADDR input of alternate message RAM 300 during the read operation. On the other hand, responsive to a logic 0 CONT1 control signal on lead 630, alternate message store 3000 is enabled to be written for initialization with predetermined data extended thereto over cable 610. The predetermined data are written into a memory location having an address corresponding to an input time slot. The write address is extended over cable 620 through address select 310 to the ADDR address input of alternate message RAM 300.

Also, to avoid spurious operation, enable control 330 includes AND gates and OR gates for providing either a logic 1 or a logic 0 enable signal to the EN enable input of RAM 300. Responsive the logic 1 EN signal, the alternate message RAM will either read or write responsive to the signal supplied to its R/W enable input. On the other hand, responsive to a logic 0 EN input, the alternate message RAM remains inactive. Hence, enable control 330 parallels the aforedescribed enable controls 230-1 and 230-2 for avoiding spurious operation.

We note that in our illustrative embodiment, an alternate message RAM location corresponds to an input time slot. Also, the predetermined data, which is written into each location, is assumed to comprise two words, herein referred to as word 1 and word 2, respectively, and a twobit control signal as hereinafter described. Of course, other embodiments are possible. Hence it should be borne in mind that our description is not by way of limitation but rather by way of illustration.

Next, to allow flexibility both in the operation and in the maintenance of time slot interchanger 1000, an external select signal may be extended from terminal 850 over cable 851 to one input of output select control 730 for controlling the information inserted in an output time slot. Specifically, the aforementioned two-bit control signal is extended over cable 391 from alternate message store 3000 to a second input of output select control 730. In our illustrative embodiment, we assume a two-bit control signal in accord with the following table definitions:

| Control Bits | Function |
| --- | --- |
| 00 | Select data RAM unconditionally |
| 01 | Select data RAM unless external select is a logic 1, then select word 1 of alternate message store |
| 10 | Select word 1 of alternate message store unconditionally |
| 11 | Select word 2 of alternate message store unconditionally |

Also, it should be noted that (1) an output of flip-flop 240 on lead 242, (2) the RT control signal on lead 841, (3) the SYNCA signal on lead 831, and (4) the enable output of control store 400 on cable 491 are extended to other inputs of output select control 730 responsive to which a control signal is extended over cable 720 to output selector 710 for selecting the proper signal, i.e., the signal on cable 920-1, 920-2, or 920-3, for extension to output terminal 9000.

More specifically, responsive to detecting '00' control bits on cable 391, output select control 730 extends a control signal over cable 720 to output select 710 for selecting and inserting the contents of either data RAM 200-1 or data RAM 200-2 into an output time slot. As mentioned, the '0' output of flip-flop 240 extends a logic 1 over lead 242 responsive to which data RAM 200-2 operates in a sequential mode. Inasmuch as the RT control signal is assumed to be a logic 1, the sequential mode is employed in writing a data RAM. Hence, a logic 1 on lead 242 implies that data RAM 200-1 is enabled for reading whereas a logic 0 on lead 242 implies that data RAM 200-2 is enabled for reading.

In similar fashion, responsive to detecting '01' control bits on cable 391, output select control 730 extends a control signal over cable 720 to output select 710 for either (1) selecting and inserting the contents of a data RAM into an output time slot or (2) selecting and inserting word 1 of alternate message store 3000 into the output time slot. Responsive to a logic 0 external select signal on lead 851, the contents of the data RAM are selected in fashion similar to that aforedescribed for detecting '00' control bits on cable 391. Responsive to a logic 1 external select signal on lead 851, word 1 of the alternate message store is so selected.

Again in similar fashion, responsive to detecting '10' or '11' control bits respectively on cable 391, the output select control signal on cable 720 is for selecting word 1 or word 2 respectively, and extending same over cable 920-3 for insertion in the output time slot. Thereby our TSI 1000 includes an arrangement for selectively inserting an alternate message in an output time slot and broadcasting same to many locations.

Although our invention has been described and illustrated in detail, it is to be understood that the same is by way of illustration and example only. Various modifications will occur to those skilled in the art and the invention is not to be considered limited to the embodiment chosen for purposes of disclosure. For example, control RAM 400 could be updated on a dynamic basis. Thus, the spirit and scope of our invention are limited only by the appended claims.

We claim:

1. Apparatus for interchanging time slots (1000) said interchanging apparatus including an input terminal (810) adapted to receive an input frame, said input frame having a first plurality of input time slots, each input time slot for communicating a sample of information;
   data storage means (2000) having a plurality of storage locations;
   first (5000) and second (430) counter means for cyclically producing first and second signals, said first signal for identifying a first time slot, said second signal for identifying a second time slot;
   means for extending an input time slot sample from an input time slot through a storage location to an output time slot and thence to an output terminal (9000) for insertion in an output frame, said output frame having a second plurality of time slots and characterized in that said interchanging apparatus further comprises:
   control store means (4000, 400, 490) responsive to said second time slot identifying signal for extending a third time slot identifying signal to said data storage means, said third time slot signal corresponding to a first time slot identifying signal, and
   means responsive to said third time slot signal for extending said sample through said storage location to a plurality of output time slots whereby an input sample may be broadcast through the plurality of output time slots to many locations.

2. The interchanging apparatus defined in claim 1 further comprising:
   means (3000, 710, 730) for selectively inserting an alternate message in one or more of said output time slots.

3. The interchanging apparatus defined in claim 1 further comprising:
   means (6000) for altering said third time slot identifying signal.

4. Apparatus for interchanging time slots (1000) said interchanging apparatus including an input terminal (810) adapted to receive an input frame, said input frame having a first plurality of input time slots, each input time slot for communicating a sample of information;
   data storage means (2000) having a plurality of storage locations;
   means for extending an input time slot sample from an input time slot through a storage location to an output time slot and thence to an output terminal (9000) for insertion in an output frame, said output frame having a second plurality of time slots and characterized in that said interchanging apparatus further comprises:
   means (3000, 710, 730) for selectively substituting an alternate message in one or more output time slots in place of said input sample, said alternate message being different than said input sample, whereby said alternate message rather than said input sample may be broadcast through one or more output time slots to many locations.

5. The interchanging apparatus defined in claim 4 further comprises:
   means (6000) for altering said alternate messages.

* * * * *